United States Patent
Vega

(10) Patent No.: US 10,406,468 B2
(45) Date of Patent: Sep. 10, 2019

(54) BAFFLE PLATE FILTERING SYSTEM FOR PREVENTING AMBIENT AIR CONTAMINANTS FROM ENTERING MACHINERY OR EQUIPMENT IN ORDER TO PROTECT INTERNAL COMPONENTS OF THE MACHINERY OR EQUIPMENT FROM BEING CONTAMINATED OR FOULED

(71) Applicant: Ignacio Vega, Countryside, IL (US)

(72) Inventor: Ignacio Vega, Countryside, IL (US)

(73) Assignee: A. J. ANTUNES & CO., Carol Stream, IL (US)

( * ) Notice: Subject to any disclaimer, the term of this patent is extended or adjusted under 35 U.S.C. 154(b) by 204 days.

(21) Appl. No.: 15/619,416

(22) Filed: Jun. 9, 2017

(65) Prior Publication Data

US 2018/0353887 A1    Dec. 13, 2018

(51) Int. Cl.
*B01D 45/08*    (2006.01)

(52) U.S. Cl.
CPC ................................ *B01D 45/08* (2013.01)

(58) Field of Classification Search
CPC .............................. B01D 45/04; B01D 45/08
USPC ............................... 55/385.6, 462, 465, 471
See application file for complete search history.

(56) References Cited

U.S. PATENT DOCUMENTS

| | | | |
|---|---|---|---|
| 4,560,395 A | 12/1985 | Davis | |
| 6,361,578 B1 | 3/2002 | Rubinson | |
| 8,619,423 B2 * | 12/2013 | Kim | B04C 3/00 361/694 |
| 2002/0178695 A1 | 12/2002 | Poirier | |
| 2012/0247075 A1 | 10/2012 | Park et al. | |
| 2015/0362196 A1 | 12/2015 | Chen et al. | |
| 2016/0105995 A1 | 4/2016 | Falk | |

* cited by examiner

*Primary Examiner* — Robert A Hopkins
(74) *Attorney, Agent, or Firm* — Law Offices of Steven W. Weinrieb

(57) ABSTRACT

A baffle plate filtering system is disclosed which is adapted to be operatively associated with an external housing wall of a piece of machinery or equipment, through which cooling air is to be ingested or inducted in order to cool internal operative components of the machinery or equipment, wherein the baffle plate filtering system will effectively prevent the ingestion or induction of ambient particulates, contaminants, grease, dirt, and the like into the internal regions of the machinery or equipment such that the operative components of the machinery or equipment do not become contaminated or fouled by means of the ambient particulates, contaminants, grease, dirt, and the like.

10 Claims, 3 Drawing Sheets

BAFFLE PLATE FILTERING SYSTEM FOR PREVENTING AMBIENT AIR CONTAMINANTS FROM ENTERING MACHINERY OR EQUIPMENT IN ORDER TO PROTECT INTERNAL COMPONENTS OF THE MACHINERY OR EQUIPMENT FROM BEING CONTAMINATED OR FOULED

FIELD OF THE INVENTION

The present invention relates generally to machinery or equipment, and more particularly to a baffle plate filtering system which is adapted to be operatively associated with an external housing wall of the machinery or equipment, through which cooling air is ingested or inducted in order to cool internal operative components of the machinery or equipment, so as to effectively prevent the internal operative components of the machinery or equipment from becoming contaminated or fouled by ambient particulates, contaminants, grease, dirt, and the like.

BACKGROUND OF THE INVENTION

In connection with many different types of machinery or equipment, internal operative components often generate heat. This heat can potentially be deleterious to the normal operations of the machinery or equipment, or to the various internal operative components themselves, if sufficient cooling of the internal operative components is not provided. The internal operative components may comprise, for example, circuit boards, rotary shafts, bearings, and the like. Accordingly, most machinery or equipment are provided with induction fans which are specifically designed to ingest or induct ambient air into the internal portions of the machinery or equipment so as to in fact provide sufficient cooling to those internal operative components which are generating heat as the machinery or equipment operates. It is also known, however, that the ambient cooling air cannot be simply ingested or, inducted into the internal portions of the machinery or equipment due to the fact that the ambient air usually comprises various particulates, contaminants, grease, dirt, or the like, which, if unfiltered or otherwise prevented from entering the internal operative regions of the machinery or equipment, could result in the contamination, fouling of the internal operative components of the machinery or equipment which, in turn, could result in the ultimate stoppage or breakdown of the machinery or equipment. Accordingly, such machinery or equipment is usually provided with conventional air filters which may comprise mesh screens, paper or fabric air filters, or the like. Utilizing such types of filters, however, has not proven to be very satisfactory in that these types of filters tend to get fouled or clogged relatively quickly whereby they need to be exchanged, cleaned, or replaced within a relatively short period of time by maintenance personnel. These necessary procedures of course lead to significant accumulative down time in order to permit the maintenance personnel to perform the necessary maintenance or cleaning operations.

A need therefore exists in the art for a new and improved filtering system for preventing particulates, contaminants, grease, dirt, or the like, from being ingested or inducted into the internal regions of machinery or equipment as a result of being entrained within the ingested cooling air so as not to contaminate or foul the internal operative components of the machinery or equipment. Another need exists in the art for a new and improved filtering system which will prevent particulates, contaminants, grease, dirt, or the like, from being ingested into the internal regions of the machinery or equipment as a result of being entrained within the ingested or inducted cooling air, and which will effectively overcome the operational drawbacks characteristic of filtering systems which are conventionally being used in connection with various different types of machinery or equipment. Still another need exists in the art for a new and improved filtering system for not only preventing particulates, contaminants, grease, dirt, or the like, from being ingested into internal operative regions of the machinery or equipment as a result of being entrained within the ingested or inducted cooling air, but in addition, will more efficiently remove the particulates, contaminants, dirt, grease, or the like from the ingested cooling air such that the frequency of maintenance operations, comprising the replacement, exchange, or cleaning of the filtering system, can be minimized. Still yet another need exists in the art for a new and improved filtering system for not only preventing particulates, contaminants, grease, dirt, or the like, from being ingested into internal operative regions of the machinery or equipment as a result of being entrained within the ingested cooling air, but in addition, when maintenance operations, comprising the exchange, replacement, or cleaning of the filtering system, are required, the filtering system can be quickly removed, cleaned, exchanged, or replaced. Yet still another need exists in the art for a new and improved filtering system for preventing particulates, contaminants, grease, dirt, or the like, from being ingested into internal operative regions of the machinery or equipment as a result of being entrained within the ingested or inducted cooling air so as to effectively enhance the service life of the particular machinery or equipment. A still yet further need exists in the art for a new and improved filtering system for preventing particulates, contaminants, grease, dirt, or the like, from being ingested into internal operative regions of the machinery or equipment as a result of being entrained within the ingested cooling air wherein the new and improved filtering system can effectively be provided as an original component upon the machinery or equipment when the machinery or equipment is originally manufactured or the filtering system can be added to existing machinery or equipment.

OVERALL OBJECTIVES OF THE INVENTION

An overall objective of the present invention is to provide a new and improved filtering system for preventing particulates, contaminants, grease, dirt, or the like, from being ingested into the internal regions of machinery or equipment as a result of being entrained within ingested cooling air so as not to contaminate or foul the internal operative components of the machinery or equipment. Another overall objective of the present invention is to provide a new and improved filtering system which will prevent particulates, contaminants, grease, dirt, or the like, from being ingested into the internal regions of the machinery or equipment as a result of being entrained within the ingested cooling air, but in addition will effectively overcome the operational drawbacks characteristic of filtering systems which are conventionally being used in connection with various different types of machinery or equipment. Still another overall objective of the present invention is to provide a new and improved filtering system for not only preventing particulates, contaminants, grease, dirt, or the like, from being ingested into internal operative regions of the machinery or equipment as a result of being entrained within the ingested cooling air, but in addition, will more efficiently remove the particulates, contaminants, dirt, grease, or the like from the ingested cooling air such that the frequency of maintenance operations, comprising the exchange, replacement, or cleaning of the filtering system, can be minimized. Still yet another overall objective of the present invention is to provide a new and improved filtering system for not only preventing particulates, contaminants, grease, dirt, or the like, from being ingested into internal operative regions of the machinery or equipment as a result of being entrained within the ingested cooling air, but in addition, when maintenance operations, comprising the exchange, replacement, or cleaning of the filtering system, are required, the filtering system can be quickly removed, cleaned, exchanged, or replaced. Yet still another overall objective of the present invention is to provide a new and improved filtering system for preventing particulates, contaminants, grease, dirt, or the like, from being ingested into internal operative regions of the machinery or equipment as a result of being entrained within the ingested cooling air so as to effectively enhance the service life of the particular machinery or equipment. A still yet further overall objective of the present invention is to provide a new and improved filtering system for preventing particulates, contaminants, grease, dirt, or the like, from being ingested into internal operative regions of the machinery or equipment as a result of being entrained within the ingested cooling air wherein the new and improved filtering system can effectively be provided as an original component upon the machinery or equipment when the machinery or equipment is originally manufactured or the filtering system can be added to existing machinery or equipment.

SUMMARY OF THE INVENTION

The foregoing and other objectives are achieved in accordance with the teachings and principles of the present invention through the provision of a new and improved filtering system, for preventing particulates, contaminants, grease, dirt, or the like, from being ingested or inducted into internal operative regions of machinery or equipment as a result of being entrained within cooling air being ingested or inducted into the machinery or equipment, which comprises a baffle plate which is adapted to be fixedly secured upon an external housing wall of the equipment or machinery, such as, for example, a rear wall or a rear panel member of the machinery or equipment, wherein the rear wall or rear panel member is provided within an inlet opening behind which there is disposed an induction fan which is adapted to cause ambient air to be ingested or inducted through the opening defined within the rear wall or rear panel member of the machinery or equipment and thereby ingest or induct cooling ambient air into the internal regions of the machinery or equipment. The baffle plate is disposed in front of the inlet opening defined within the rear wall or rear panel member of the machinery or equipment so as to effectively block the opening, and the suction fan is disposed behind the inlet opening, as considered in the direction of the flow of the ingested cooling air into the equipment or machinery. As a result of this structural arrangement of the baffle plate, the opening within the external housing wall of the machinery or equipment, and the induction fan, the incoming ingested or inducted cooling air is forced into contact with the baffle plate whereby the various particulates, contaminates, dirt, grease, and the like, will adhere to the baffle plate while the resulting decontaminated incoming or ingested air flows around the upper, lower, and opposite side or end edge portions of the baffle plate so as to in fact enter the internal regions of the equipment or machinery and thereby cool the various heat-generating components thereof such as, for example, circuit boards, rotary shafts, bearings, and the like. The baffle plate is mounted within a framework so as to effectively form a baffle plate assembly, and the baffle plate assembly is removably attached to a cover plate which is removably attached to the external wall or external panel member of the machinery or equipment by suitable fasteners.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
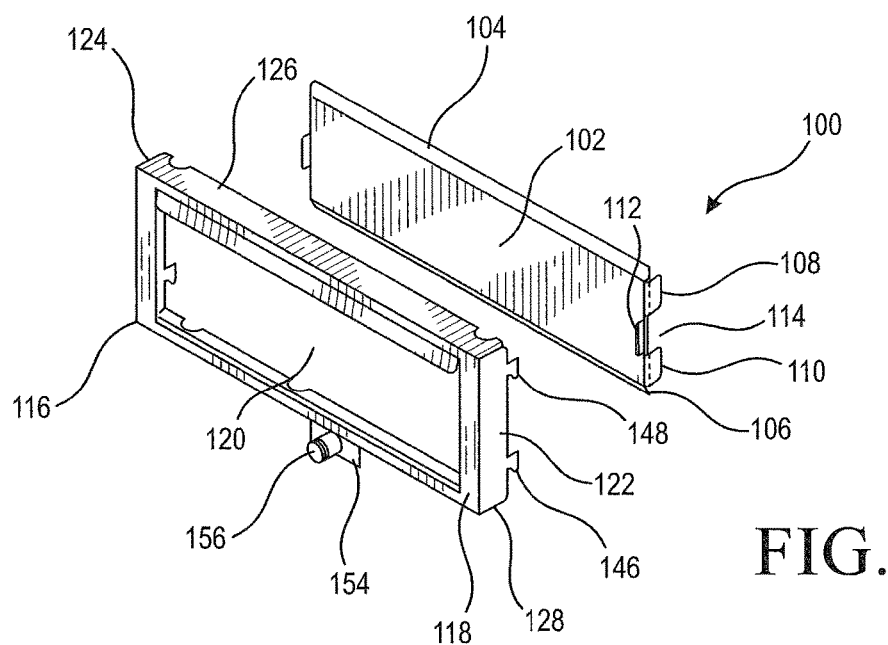
FIG. 1 is an exploded view of a baffle plate filtering assembly as constructed in accordance with the principles and teachings of the present invention and comprising a baffle plate which is adapted to be fixedly mounted internally within a baffle plate framework.
Figure 2:
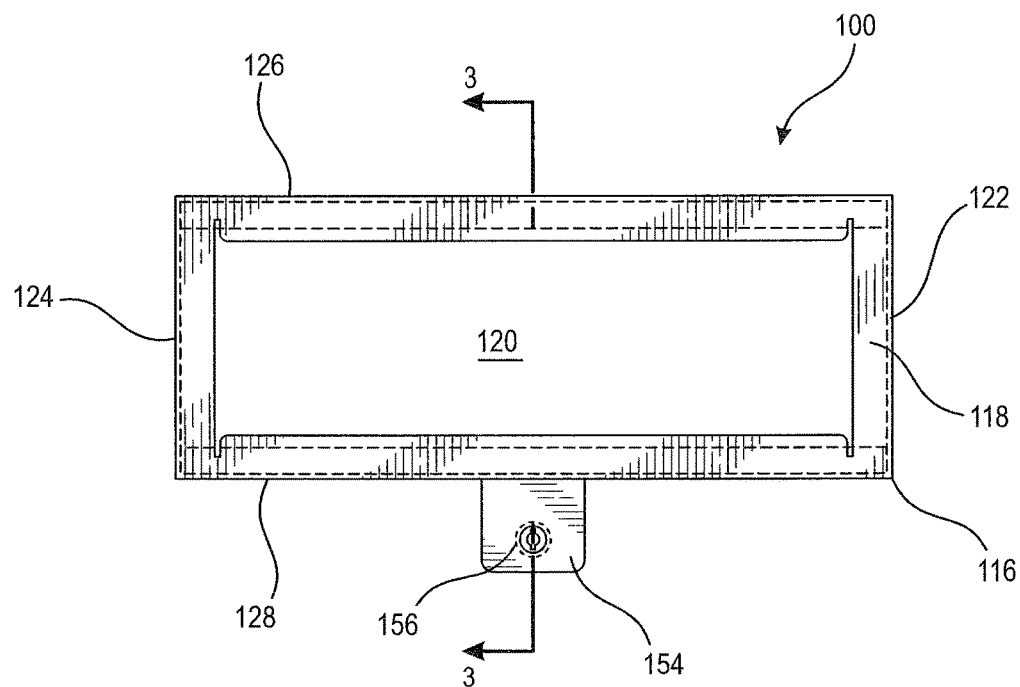
FIG. 2 is a front elevational view of the assembled baffle plate assembly as disclosed within FIG. 1.
Figure 3:
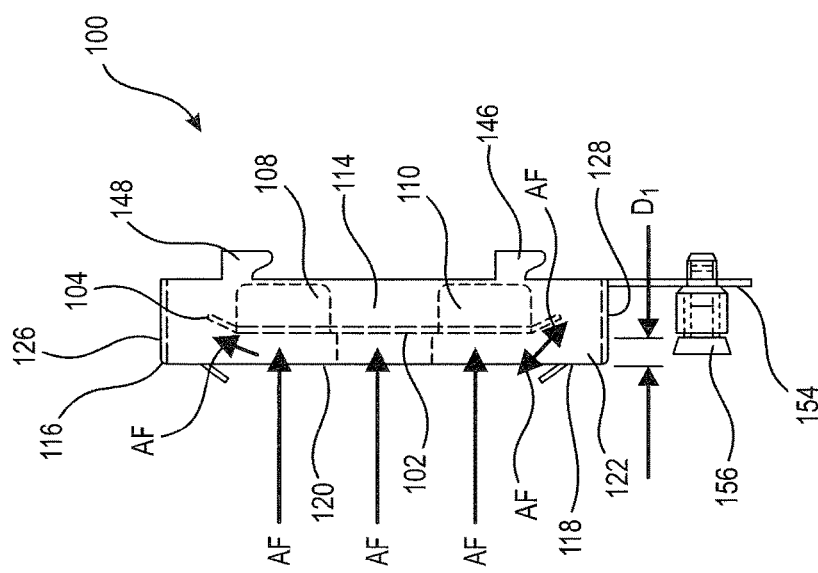
FIG. 3 is a cross-sectional view of the assembled baffle plate assembly as disclosed within FIGS. 1 and 2 and as taken along the lines 3-3 of FIG. 2.

Referring now to the drawings, and more particularly to FIGS. 1-3 thereof, there is disclosed a new and improved filtering system or assembly for preventing particulates, contaminants, grease, dirt, or the like, from being ingested or inducted into internal operative regions of machinery or equipment as a result of being entrained within cooling air being ingested or inducted into the machinery or equipment, wherein the filtering system or assembly is generally indicated by the reference character 100. More particularly, it is seen that the filtering assembly 100 comprises a baffle plate 102 which has a substantially rectangular configuration. Upper and lower edge portions of the baffle plate 102 are provided with angled air deflector members 104,106, the functionality of which will be discussed hereinafter, and it is further seen that each one of the opposite side edge portions of the baffle plate 102 comprises a pair of vertically spaced inwardly directed tab members 108, 110 which are disposed substantially perpendicular to the plane within which the baffle plate 102 is disposed, and an outwardly directed tab member 112 which is interposed between the pair of inwardly directed tab members 108,110. As a result of this cooperative structure defined by means of the upper and lower tabs members 108,110 and the intermediate tab member 112, an air space 114 is effectively defined within each one of the side edge portions of the baffle plate 102. The filtering system or assembly 100 is also seen to comprise a baffle plate framework 116 within which the baffle plate 102 is adapted to be fixedly secured. More particularly, it is seen that the baffle plate framework 116 effectively comprises a substantially hollow rectangular framework having the configuration of a rectangular parallelepiped comprising a rectangular front frame portion 118 which has an open front face portion 120 defined therein through which incoming ingested or inducted ambient air will flow. In addition, framework 116 also includes a pair of opposite side walls 122, 124 that are oriented perpendicular to the plane within which the front frame portion 118 is disposed. The framework 116 is completed by means of a pair of oppositely disposed upper and lower walls 126,128 which are disposed perpendicular to the plane within which the front frame portion 118 is disposed as well as being oriented perpendicular to the planes within which the side walls 122,124 are disposed, the three different walls or frame members 118, 122,124,126,128 being mutually orthogonal with respect to each other. As can best be appreciated from FIG. 3, when the baffle plate 102 is to be fixedly secured internally within the baffle plate framework 116, the upper and lower vertically spaced tab members 108,110, disposed upon opposite sides of the baffle plate 102, are adapted to be fixedly secured to internal surface portions of the side walls 122,124 of the baffle plate framework 116. The tab members 108, 110 may be spot welded to the internal surface portions of the side walls 122,124 or fixedly secured thereto by other fastening means, however, regardless of the manner by means of which the tab members 108,110 of the baffle plate 102 are fixedly secured to the internal surface portions of the side walls 122,124 of the baffle plate framework 116, it is seen that the baffle plate 102 is set back, by means of a predetermined distance $D_1$, from the plane within which the front frame portion 118 of the baffle plate framework 116 is disposed or from the plane defining the open front face portion 120 of the baffle plate framework 116. In this manner, as will be more fully understood hereinafter, when ambient incoming air is ingested or inducted into and through the baffle plate assembly 100, the incoming ambient ingested or inducted cooling air will pass through the open front face portion 120 of the baffle plate framework 116, impact upon the baffle plate 102, will be deflected upwardly and downwardly so as to pass by the upper and lower deflector edge portions 104, 106 of the baffle plate 102, and will also pass through the spaces 114 defined within the opposite side edge portions of the baffle plate 102, as schematically shown in FIG. 3 by means of the arrows AF denoting the air flows.

Figure 5:
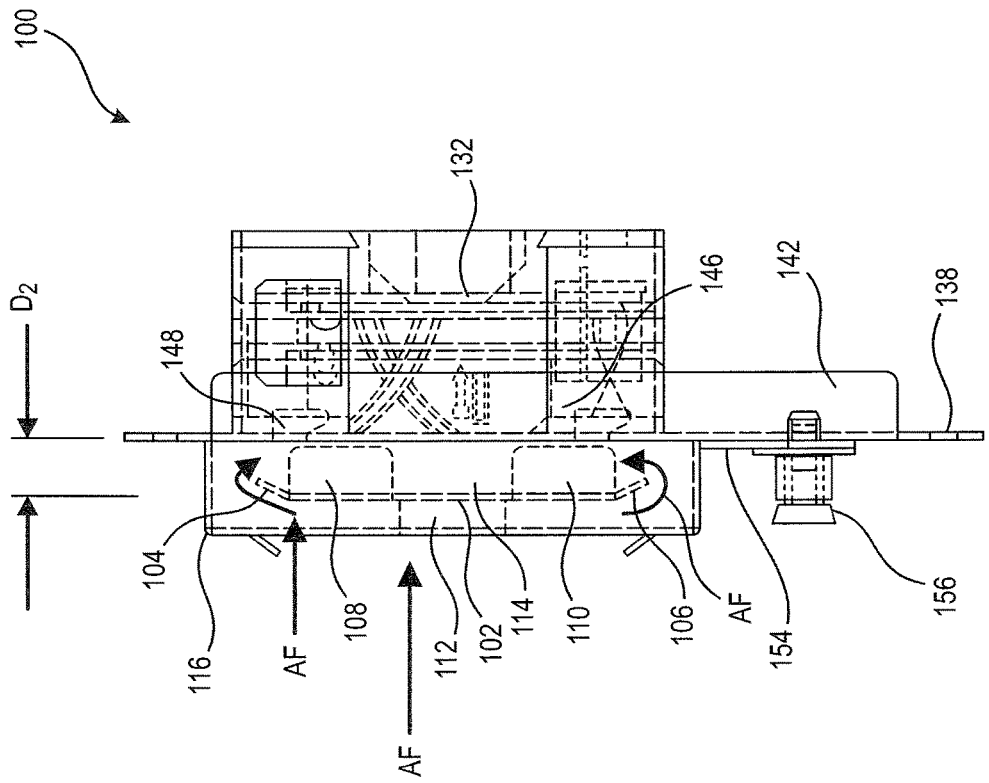
FIG. 5 is a cross-sectional view of the baffle plate filtering assembly as mounted upon the cover plate covering the ambient air inlet opening defined within the external wall or panel of the piece of machinery or equipment as illustrated within FIG. 4 and into which cooling ambient air is to be inducted by means of an induction fan as disclosed within FIG. 5 and which is disposed upon the internal side of the cover plate so as to induct cooling air into the equipment or machinery in order to cool the operating components thereof, FIG. 5 being taken along lines 5-5 of FIG. 4.
Figure 6:
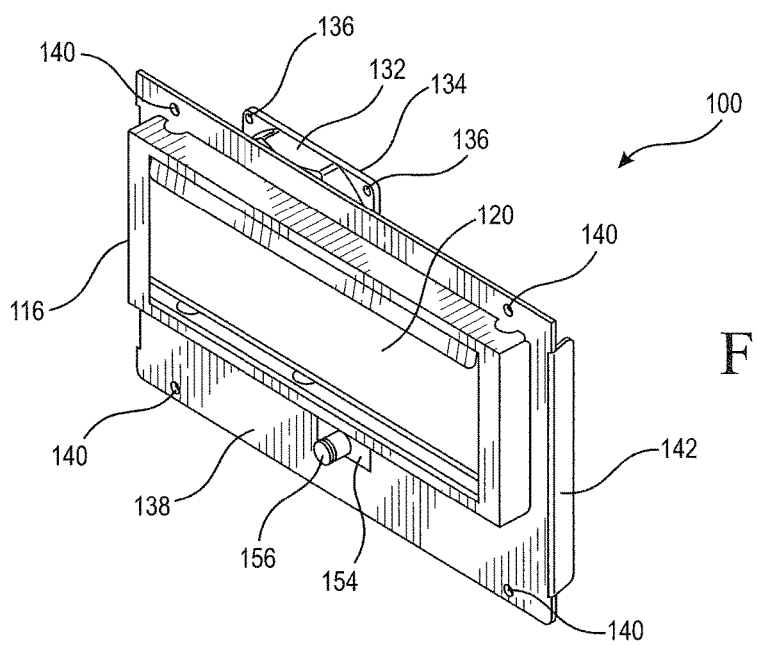
FIG. 6 is a perspective view of the baffle plate filtering assembly as mounted upon the cover plate covering the ambient air inlet opening of the piece of machinery or equipment and as illustrated within FIGS. 4 and 5.
Figure 4:
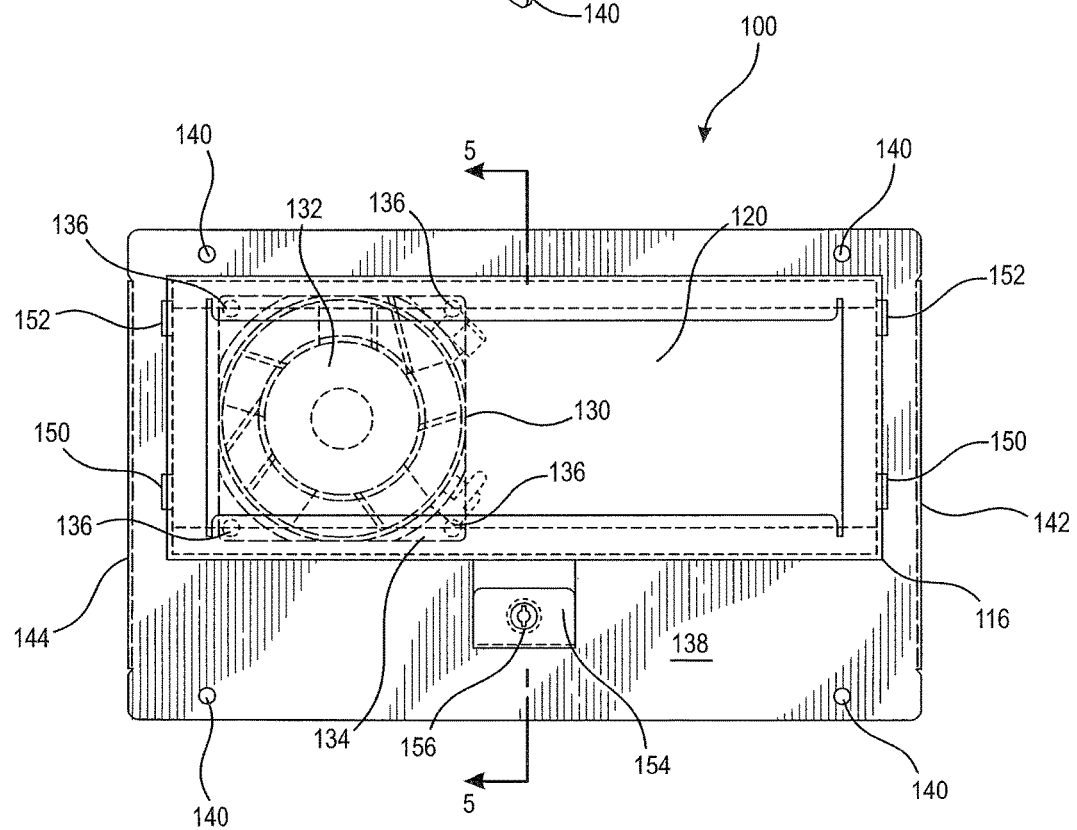
FIG. 4 is a front elevational view showing the baffle plate filtering assembly, as disclosed within FIGS. 1-3, as mounted upon a cover plate covering an ambient air inlet opening defined within an external wall or panel of a piece of machinery or equipment into which cooling ambient air is to be inducted so as to cool internal components of the equipment or machinery.

With reference now being made to FIGS. 4-6, when the baffle plate filtering system or assembly 100 is adapted to be utilized in conjunction with machinery or equipment which comprises various operational components that are to be cooled, an external wall of the machinery or equipment housing will be provided with a relatively large hole formed within the external wall, the hole being schematically illustrated at 130 as a substantially square-shaped hole. A suction or induction fan and its assembly 132 is fixedly secured to an external surface portion of the external wall of the machinery or equipment by means of a substantially square-shaped mounting plate 134 by means of suitable fasteners 136, a portion of the induction fan assembly housing 132 projecting forwardly away from the external surface portion of the external wall of the machinery or equipment. In a similar manner, a cover plate 138 is adapted to be fixedly secured to an external surface portion of the external wall of the machinery or equipment by means of suitable fasteners 140, and it is noted that the opposite side edge portions of the cover plate 138 are provided with spacers 142,144, as can best be seen from FIGS. 4 and 6, such that when the cover plate 138 is fixedly secured to the external surface portion of the external wall of the machinery or equipment, the cover plate 138 is effectively spaced from the external surface portion of the external wall of the machinery or equipment so as to not only accommodate the aforenoted forwardly projecting portion of the induction fan assembly housing 132, but in addition, to accommodate the tab members 146,148 as can best be appreciated from FIGS. 3 and 5. The cover plate 138 is of course provided with a hole or aperture, not shown, similar to the hole or aperture 130 defined within the external wall portion of the machinery or equipment such that the hole or aperture 130 remains accessible to the incoming or inducted ambient cooling air.

In addition, it is seen that the filtering system or assembly 100 is adapted to be removably mounted upon the cover plate 138. More particularly, reverting back to FIGS. 1-3, it is seen that each one of the opposite side walls 122,124 of the baffle plate framework 116 is provided with a pair of vertically spaced, male hook-shaped fastening members 146,148 which are adapted to be inserted into or disposed within a pair of vertically spaced female receptive slots 150,152 provided within oppositely disposed portions of the cover plate 138 as may best be seen in FIG. 4. Still further, a mounting tab 154 is fixedly attached to the lower surface portion 128 of the baffle plate framework 116 and is provided with a threaded fastener 156 which extends through the mounting tab 154 and threadedly engages a tapped bore, not illustrated, defined within the cover plate 138 as can best be seen in FIG. 5. It can therefore be readily appreciated that when the filtering system or assembly 100 is to be attached to the cover plate 138, the vertically spaced tab members 146,148 are inserted into the vertically spaced slots 150,152 defined within the cover plate 138, and once the tab members 136, 138 are effectively fixedly secured within the slots 150,152, the fastener 156 is then passed through the mounting tab 154 and threadedly engaged within cover plate 138 so as to in fact fixedly retain the filtering system or assembly 100 upon the cover plate 138.

Having described substantially all of the various components comprising the new and improved baffle filtering system or assembly 100 for use in connection with a suction or induction fan 132 for ingesting or inducting ambient cooling air into internal regions of a piece of machinery or equipment in order to cool various heat-generating components of the machinery or equipment while simultaneously preventing the ingestion or induction of particulates, contaminants, grease, dirt, or the like into the internal regions of the machinery or equipment, where such particulates, contaminants, grease, dirt, or the like can be detrimental to the operation or function of the various operative components of the machinery or equipment, a brief operation of the new and improved baffle filtering system or assembly 100 will now be described. As has been previously noted, machinery and equipment, having heat-generating components disposed internally thereof, are conventionally provided with an ambient cooling air induction system so as to cause ambient cooling air to be ingested or inducted into the internal regions of the equipment or machinery in order to provide cooling for the heat-generating components. However, it is simultaneously desirable to effectively prevent the ingestion or induction of particulates, contaminants, grease, dirt, and the like into the internal regions of the equipment or machinery. Accordingly, once the cover plate 138 has been affixed to the external wall member of the machinery or equipment by means of fasteners 140, and once the new and improved baffle filtering system or assembly 100 has been assembled together as can be appreciated from FIGS. 1 and 3, and in turn, once the new and improved baffle filtering system or assembly 100 has been fixedly attached to the cover plate 138 as has been described in connection with FIGS. 3-6, when the induction fan 132 is energized, ambient cooling air will be ingested or inducted into the internal regions of the machinery or equipment as a result of the incoming ambient cooling air flowing through the front opening 120 defined within the baffle filter framework 116. It is also noted at this juncture that the baffle plate 102, affixed to and within the baffle plate framework 116, is also disposed a predetermined distance $D_2$ from the plane of the cover plate 138.

As can therefore best be appreciated from FIGS. 3 and 5, as the incoming ambient cooling air passes through the front opening 120 defined within the baffle filter framework 116, it will immediately encounter the baffle plate 102 whereupon the air flow will effectively be split into multiple air flows AF whereby some of the air flow AF flows upwardly around the upper deflector edge or lip 104 of the baffle plate 102, some of the air flow AF flows downwardly around the lower deflector edge or lip 106 of the baffle plate 102, and some of the air flow AF flows around the opposite side edge portions of the baffle plate 102 so as to flow through the side edge openings 114. All of the air flows AF will then effectively converge with each other within the volumetric air space defined between the rear surface portion of the baffle plate 102 and the external surface portion of the cover plate 138 so as to then effectively be ingested or inducted into the internal regions of the machinery or equipment by means of the induction fan 132. It has been determined that the baffle plate 102 may be fabricated from any one of a variety of materials, however, a stainless steel baffle plate has proven to be quite satisfactory in facilitating the collection of various particulates, contaminants, grease, dirt, and the like upon the baffle plate and therefore effectively removing such particulates, contaminants, grease, dirt, and the like from the incoming ambient cooling air which then proceeds into the internal regions of the machinery or equipment such that the relatively clean air does not deleteriously affect the various operative components of the machinery or equipment.

Obviously, many variations and modifications of the present invention are possible in light of the above teachings. For example, the machinery or equipment housing may be fabricated from stainless steel, and therefore, the baffle framework may simply be mounted upon the stainless steel housing by means of suitable magnetic structures incorporated within the baffle framework, or alternatively, cooperating magnetic fasteners may be incorporated within or mounted upon both the equipment or machinery housing and the baffle framework. It is therefore to be understood that within the scope of the appended claims, the present invention may be practiced other-wise than as specifically described herein.

REFERENCE NUMBER KEY

100—Filtering system or assembly
102—Baffle plate of assembly 100
104—Upper deflector of baffle plate 102
106—Lower deflector of baffle plate 102
108—Upper tab fixedly securing baffle plate 102 to interior of framework 116
110—Lower tab fixedly securing baffle plate 102 to interior of framework 116
112—Intermediate tab of baffle plate 102 defining air space 114
114—Air space defined along side edge portion of baffle plate 102
116—Framework for containing baffle plate 102
118—Front frame portion of framework 116
120—Front opening defined within front frame portion 118 of framework 116
122—Right side wall portion of framework 116
124—Left side wall portion of framework 116
126—Upper wall portion of framework 116
128—Lower wall portion of framework 116
130—Square-shaped hole defined within external wall of the machinery
132—Induction fan
134—Plate for mounting induction fan 132 to the external wall of the machinery
136—Fasteners for mounting mounting plate 134
138—Cover plate for mounting to external wall of machinery
140—Fasteners for mounting cover plate 138
142—Right edge spacer of cover plate 138
144—Left edge spacer of cover plate 138
146—Lower tab member for mounting framework 116 upon cover plate 138
148—Upper tab member for mounting framework 116 upon cover plate 138
150—Lower slots in cover plate 138 for receiving lower tab members 146
152—Upper slots in cover plate 138 for receiving lower tab members 146
154—Mounting tab for fixing framework 116 upon cover plate 138
156—Threaded fastener for engaging cover plate 138
AF—Air flows of incoming ambient cooling air
$D_1$—Distance that baffle plate 102 is set back from opening 120 in framework 116
$D_2$—Distance between baffle plate 102 and cover plate 138

What is claimed as new and desired to be protected by Letters Patent, is:

1. A baffle plate filtering assembly for preventing particulates, contaminants, dirt, grease, and the like from entering internal regions of equipment or machinery which contain heat-generating components and which is provided with a fan, mounted upon an external wall portion of the machinery or equipment, and wherein the external wall portion of the equipment or machinery is provided with an aperture through which ambient cooling air can be inducted through the aperture and into the internal regions of the equipment or machinery by the fan so as to cool the heat-generating components of the machinery or equipment, comprising:

a cover plate fixedly mounted upon the external wall portion of the machinery or equipment;

a framework mounted upon said cover plate fixedly mounted upon the external wall portion of the machinery or equipment, disposed in front of the aperture and the fan, and having a front opening defined within a front frame portion of said framework and through which incoming ambient air, containing particulates, contaminants, dirt, grease, and the like, can flow; and a baffle plate mounted within said framework so as to be disposed directly within the flow path of the ambient cooling air being inducted through said front opening defined within said framework, whereby as the fan moves ambient cooling air through said front opening defined within framework, said ambient cooling air, containing particulates, contaminants, grease, dirt, and the like, will encounter said baffle plate such that the particulates, contaminants, grease, dirt, and the like will adhere to said baffle plate while decontaminated cooling ambient air will flow around said baffle plate and enter the internal regions of the machinery or equipment so as to cool heat-generating components of the machinery or equipment without fouling the heat-generating components of the machinery or equipment.

2. The baffle plate filtering assembly as set forth in claim 1, wherein:

said baffle plate is fixedly mounted within said framework at a predetermined position set back a predetermined distance from said opening defined within said front frame portion of said framework.

3. The baffle plate filtering assembly as set forth in claim 1, wherein:

said baffle plate comprises upper and lower air deflector portions, as well as a pair of air spaces respectively defined upon opposite side edge portions of said baffle plate for permitting the decontaminated air to flow around said upper and lower air deflector portions and through said pair of air spaces defined upon said opposite side edge portions of said baffle plate so as to permit the decontaminated ambient cooling air to flow into the internal regions of the machinery or equipment.

4. The baffle plate filtering assembly as set forth in claim 1, further comprising:

a plurality of fasteners for fixedly mounting said framework upon said cover plate.

5. The baffle plate filtering assembly as set forth in claim 4, wherein:

wherein said plurality of fasteners for fixedly mounting said framework upon said cover plate comprise a plurality of tab members provided upon said framework and a plurality of slot members defined within said cover plate for accommodating said plurality of tab members provided upon said framework.

6. The baffle plate filtering assembly as set forth in claim 4, wherein:

wherein said plurality of fasteners for fixedly mounting said framework upon said cover plate comprises a tab member fixedly provided upon said framework, and a threaded fastener passing through said tab member and threadedly engaging a tapped/threaded hole defined within said cover plate.

7. The baffle plate filtering assembly as set forth in claim 5, further comprising:

a pair of spacers fixedly mounted upon opposite side edge portions of said cover plate for engaging the external wall portion of the machinery or equipment when said cover plate is fixedly secured to the external wall portion of the machinery or equipment so as to define spaces for accommodating said plurality of tab members of said cover plate after said plurality of tab members have been inserted into said plurality of slot members defined within said cover plate.

8. The baffle plate filtering assembly as set forth in claim 1, wherein:

said baffle plate is fabricated from stainless steel.

9. The baffle plate filtering assembly as set forth in claim 1, wherein:

the machinery or equipment housing is fabricated from stainless steel, and said baffle framework has magnetic structures incorporated therein such that said baffle framework can be fixedly mounted upon the machinery or equipment housing.

10. The baffle plate filtering assembly as set forth in claim 1, wherein:

cooperating magnetic fasteners may be respectively incorporated within or mounted upon both the machinery or equipment housing and said baffle framework such that said baffle framework can be fixedly mounted upon the machinery or equipment housing.

* * * * *